United States Patent [19]
Harrison

[11] 3,780,835
[45] Dec. 25, 1973

[54] DISC BRAKES FOR VEHICLES

[75] Inventor: Anthony William Harrison, Birmingham, England

[73] Assignee: Girling Limited, Tyseley, Birmingham, England

[22] Filed: July 20, 1971

[21] Appl. No.: 164,356

[30] Foreign Application Priority Data
July 24, 1970    Great Britain............... 35,888/70

[52] U.S. Cl..................... 188/74, 188/72.2, 192/79
[51] Int. Cl........................................... F16d 51/62
[58] Field of Search............... 188/70 B, 72.2, 74, 188/29, 57, 205 A; 192/79

[56] References Cited
UNITED STATES PATENTS

| | | | |
|---|---|---|---|
| 1,433,220 | 10/1922 | Nickum | 188/74 |
| 2,638,183 | 5/1953 | Prowinsky | 188/29 |
| 2,987,144 | 6/1961 | Urquhart | 188/74 |
| 3,086,620 | 4/1963 | Elfes | 188/74 X |
| 2,170,893 | 8/1939 | Gallup | 188/72.2 X |

Primary Examiner—George E. A. Halvosa
Attorney—Scrivener, Parker et al.

[57] ABSTRACT

In a disc brake in which a friction member is movable into engagement with the periphery of a rotatable disc in a direction substantially radial with respect to the disc, the friction member or a carrier for it has an engagement with a stationary member of such a form that angular movement of the friction member with the disc on application of the brake produces a self-servo action urging the friction member towards the disc.

2 Claims, 5 Drawing Figures

DISC BRAKES FOR VEHICLES

This invention relates to improvements in disc brakes of the kind in which a friction block or shoe is adapted to engage the periphery of a rotatable disc and is mounted for movement in a substantially radial direction relative to the disc in a stationary member which may be a housing enclosing the disc.

According to our invention, in a disc brake of the kind set forth the friction block or shoe or a member by which it is carried has an engagement with the stationary member of such a form that when the block or shoe is applied to the disc and tends to be carried round with the periphery of the disc a self-servo action is produced urging the block or shoe towards the disc.

Preferably the arrangement is such that a substantially equal self-servo action is produced with the disc rotating in either direction.

In one convenient arrangement, the block or pad is formed with oppositely inclined surfaces co-operating with complementary oppositely inclined surfaces on the stationary member.

In another arrangement the friction shoe or block is pivotally mounted on a carrier having circumferentially spaced abutments co-operating with the stationary member, the carrier being adapted to rock about one or other of the abutments according to the direction of rotation of the brake disc when the brake is applied.

There may be a single block or shoe adapted to engage the periphery of the disc at one point or there may be two or more blocks or shoes angularly spaced around the disc, and these may be applied simultaneously by hydraulic or mechanical actuating means.

The disc may be the disc of a normal disc brake in which friction pads are applied to opposite faces of the disc for service braking, the block or pad engaging the periphery of the disc providing a hand brake for parking or emergency use.

Our invention is particularly applicable to brakes for tractors in which the disc is enclosed in a stationary transmission or other housing but is applicable to brakes for other vehicles as well.

Two practical forms of our improved brake are illustrated by way of example in the accompanying drawings in which.

Figure 1:
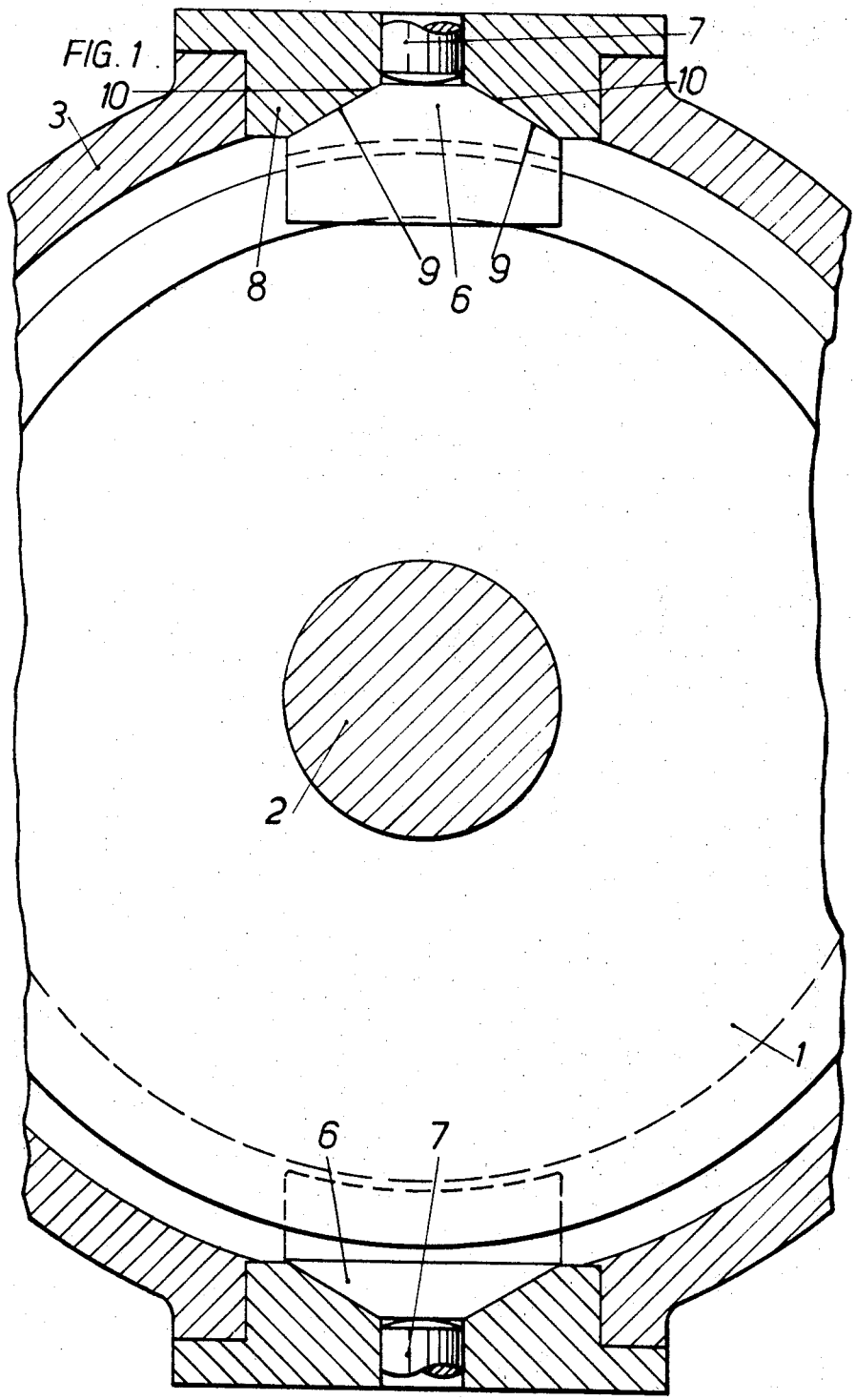
FIG. 1 is a diagrammatic end view of one form of brake.
Figure 2:
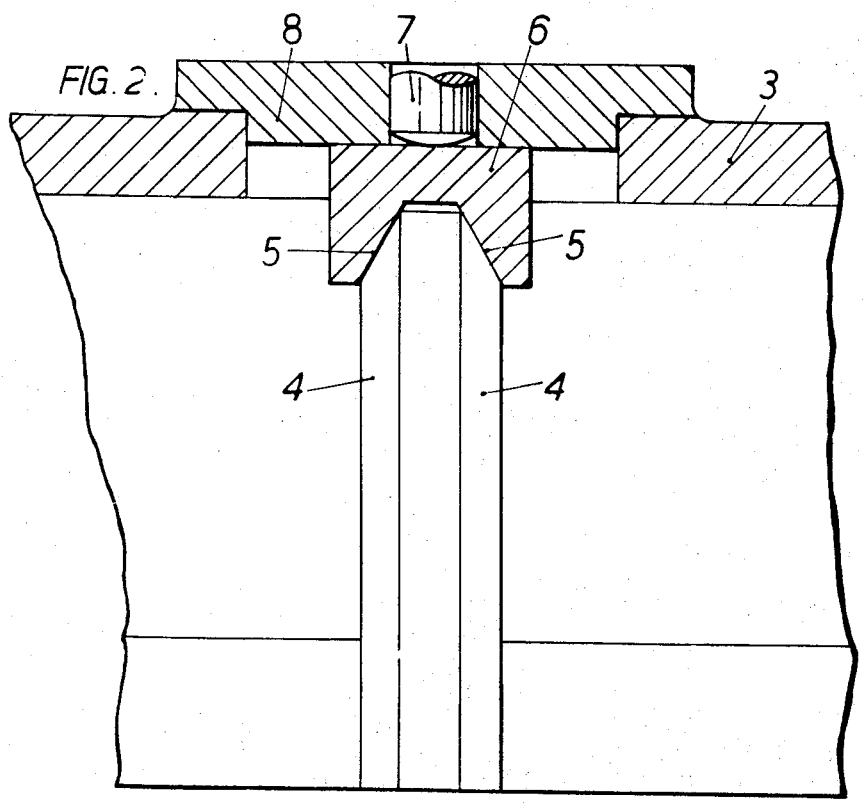
FIG. 2 is a section on the line 2—2 of FIG. 1.

In the brake shown in FIGS. 1 and 2 a disc is mounted on a rotatable shaft 2 within a stationary housing 3.

The peripheral edge of the disc is chamfered off on each side to provide oppositely inclined annular faces 4. These faces are adapted to be engaged by complementarily inclined faces 5 of a groove in the inner side of a friction block or shoe 6 which is applied by a plunger 7 radially movable in a mounting 8 which is secured into an opening in the housing. On its outer side the block or shoe has oppositely inclined surfaces 9 cooperating with complementary oppositely inclined surfaces 10 on the inner side of the mounting 8.

When the block or shoe is applied to the disc by radially inward movement of the plunger 7 the block or shoe 6 tends to be carried round with the periphery of the disc and one or other of the surfaces 9 on the block or shoe, according to the direction or rotation of the disc, is forced against a complementary surface 10 on the mounting which urges the block or shoe inwardly against the periphery of the disc.

The plunger 7 may be actuated hydraulically or mechanically by any convenient means (not shown).

Figure 3:
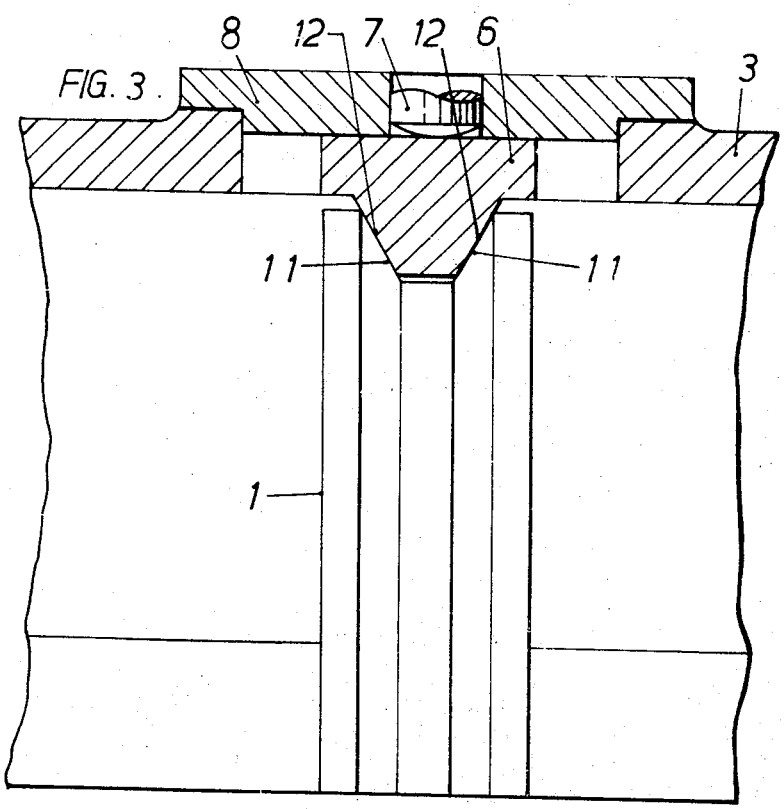
FIG. 3 is a similar section showing a modification.

In the modification shown in FIG. 3 the disc is formed with a peripheral groove having oppositely inclined faces 11, and the inner side of the block or shoe is of wedge shape with opposite faces 12 inclined at the same angle as the faces 11 on the disc. The construction otherwise is the same.

The term block or shoe is intended to include a block made wholly of friction material or made of friction material bonded to a suitable carrier.

FIG. 1 shows two friction blocks 6 engaging the disc at diametrically opposite ponts but it will be understood that the brake may incorporate only a single block or more than two blocks in which case they will be angularly spaced around the disc.

Figure 4:
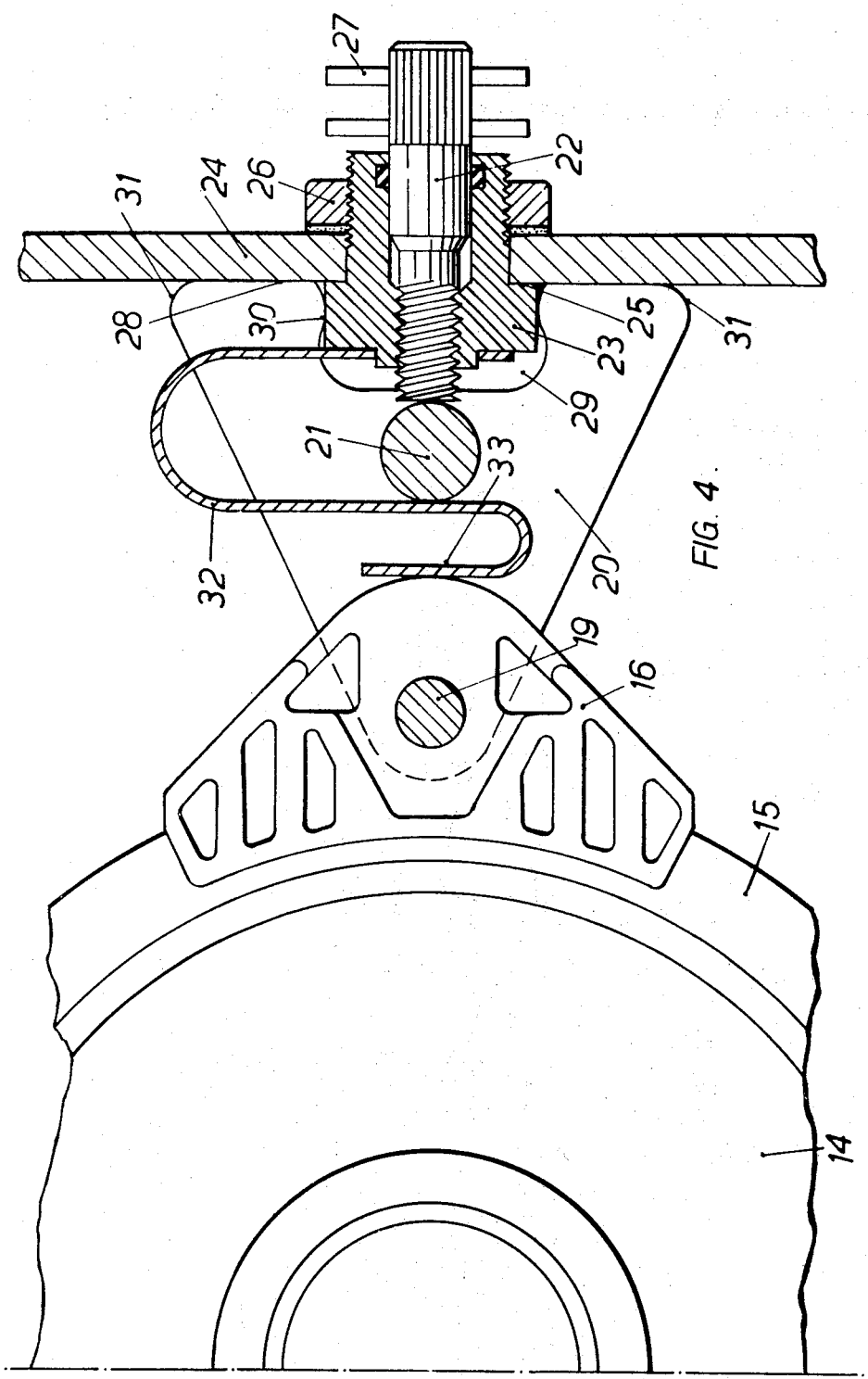
FIG. 4 is an end view, partly in section, of another form of brake.
Figure 5:
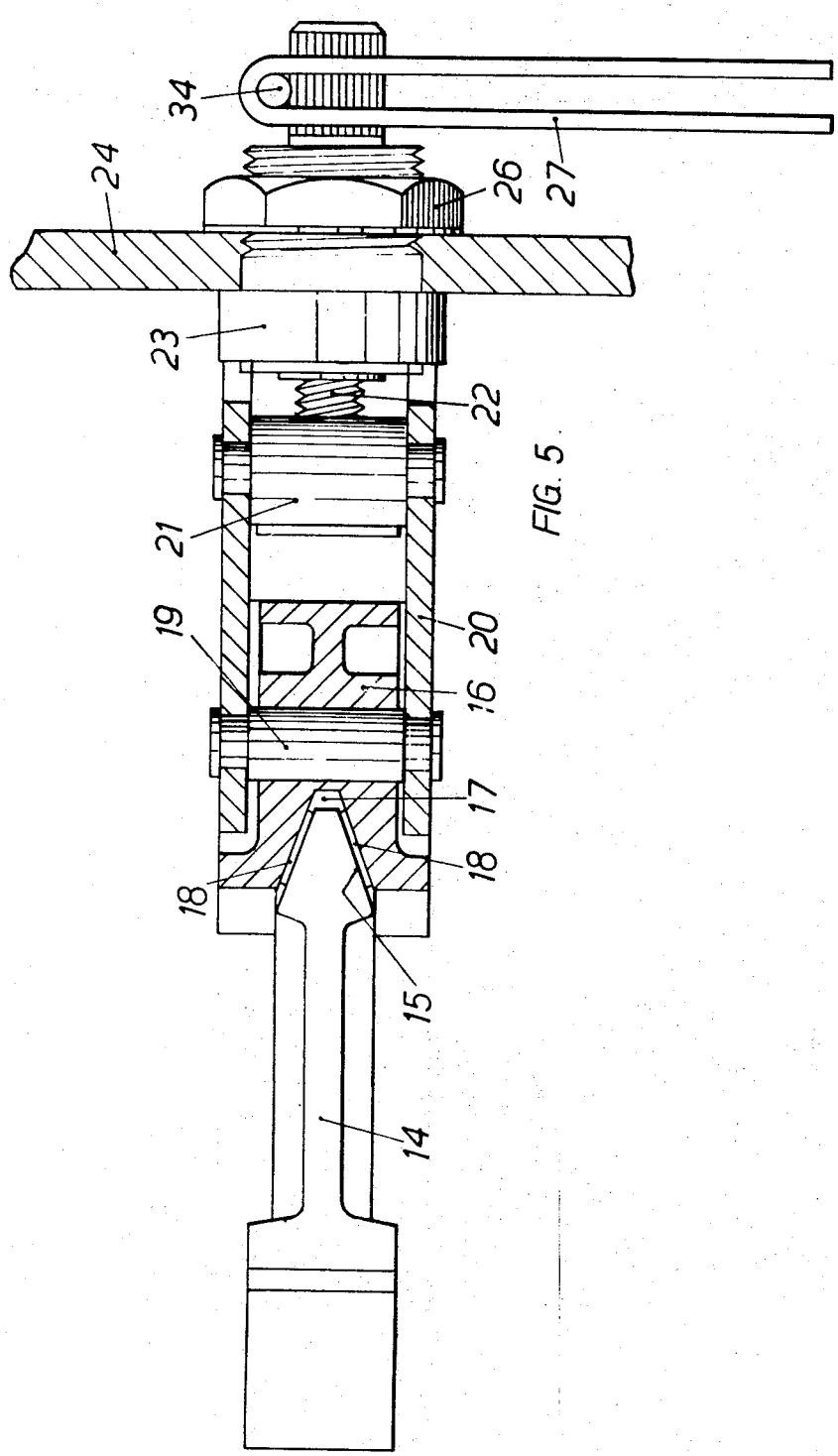
FIG. 5 is a section on the line 5—5 of FIG. 4.

In the brake shown in FIGS. 4 and 5 the periphery of the disc 14 is chamfered off on each side to provide oppositely inclined annular braking faces 15. A shoe 16 has on its radially inner face, which is arcuate and of the same radius as the disc, a groove 17 having faces complementary to the faces 15 on the disc. The faces of the groove carry linings 18 of friction material for engagement with the faces 15 on the disc.

The shoe 16 is pivotally mounted on a pin 19 in a carrier 20 formed by two aligned parallel plates of triangular outline, the pin 19 being located adjacent to the inner corner of the carrier. The two plates forming the carrier are secured together by the pin 19 and by a parallel pin 21 located about the centre of the carrier, the ends of the pins, which are of reduced diameter, being received in holes in the plates and their extremities being rivetted or spun over on the outer sides of the plates.

The pin 21 forms a thrust abutment for a radial spindle 22 passing through and in screw-threaded engagement with a fitting 23 mounted in a part 24 of the stationary brake housing. The fitting 23 has a shoulder 25 engaging the inner face of the part 24 and is clamped in position by a nut 26 screwed on the fitting on the outer side of the housing. An operating lever 27 formed by a folded metal strip is adjustably mounted on the projecting outer end of the spindle 22 for moving it angularly.

The radially outer edge 28 of the carrier 20 is flat and parallel to the member 24 against which it normally abuts, but a notch 29 is formed in it of a width sufficient to receive the inner end of the fitting 23 which locates the carrier. The side edges of thenotch are radiused as shown at 30 to allow the carrier to rock in its own plane, and the corners of the edge 28 are radiused as shown at 31.

A U-shaped blade spring 32 mounted on the inner end of the fitting 23 bears on the inner side of the pin 21 to act as a return spring urging the carrier away from the disc and into engagement with the part 24. A U-shaped extension 33 of the free end of the spring bears on the radially outer end of the shoe to prevent rattle.

The brake is applied by moving the lever 27 angularly to screw the spindle 22 radially inwards. The spindle bears on the pin 21 and moves the carrier and shoe inwardly to bring the shoe linings into engagement with the brake disc. The shoe then tends to be carried round with the disc and the carrier rocks in its own plane about one or other of the corners 31, according to the direction of rotation of the disc, so that a servo action is produced urging the shoe into engagement with the disc.

In the form illustrated the lever 27 fits over splines on the outer end of the spindle 22 on which it is clamped by a bolt 34.

On slackening the bolt the lever can be pulled off the spindle and replaced in another angular position to compensate for wear of the shoe linings.

I claim:

1. A disc brake including a friction member engageable with the periphery of a rotatable disc, a stationary member adjacent said disc, fixed abutment means carried by said stationary member, a carrier rockable at one end about said fixed abutment means and pivotally carrying at its opposite end said friction member, means mounted on said stationary member for moving said carrier radially to engage the friction member with the periphery of the disc, said carrier and friction member being constructed and arranged that upon engagement of the disc periphery by said friction member the latter is moved circumferentially with said disc and said carrier is rocked about said abutment means to sustain the braking torque exerted on said friction member.

2. The disc brake of claim 1 wherein the disc is chamfered on both sides to provide two mutually inclined annular braking surfaces, and said friction member is provided with a groove having two mutually inclined friction surfaces complementary with the braking surfaces of said disc.

* * * * *